United States Patent
Murray

(10) Patent No.: US 7,523,300 B2
(45) Date of Patent: Apr. 21, 2009

(54) COMMUNICATION SYSTEMS

(76) Inventor: Robert George Murray, 23A Mirvis Street, Nelspruit (ZA) 1201

( * ) Notice: Subject to any disclaimer, the term of this patent is extended or adjusted under 35 U.S.C. 154(b) by 867 days.

(21) Appl. No.: 10/984,458

(22) Filed: Nov. 8, 2004

(65) Prior Publication Data

US 2005/0085216 A1   Apr. 21, 2005

Related U.S. Application Data

(63) Continuation of application No. 10/297,070, filed as application No. PCT/IB01/00782 on May 9, 2001, now abandoned.

(30) Foreign Application Priority Data

May 24, 2000   (ZA) ..................... 00/2577

(51) Int. Cl.
H04M 11/00 (2006.01)
G06F 7/00 (2006.01)
H04L 9/00 (2006.01)

(52) U.S. Cl. ............... 713/150; 707/10; 455/403
(58) Field of Classification Search ........... 455/403; 713/150
See application file for complete search history.

(56) References Cited

U.S. PATENT DOCUMENTS

| | | |
|---|---|---|
| 5,974,443 A | 10/1999 | Jeske |
| 5,978,806 A | 11/1999 | Lund |
| 6,036,090 A | 3/2000 | Rahman et al. |
| 6,044,373 A | 3/2000 | Gladney et al. |

FOREIGN PATENT DOCUMENTS

WO   98/34393   8/1998

OTHER PUBLICATIONS

Pay As You Go Basic Cell Phone Service Plan, printed year 2008.*
Prepaid mobile phone, From Wikipedia, the free encyclopedia, printed year 2008.*
A security framework for mobile-to-mobile payment network, Das, M.L.; Saxena, A.; Gulati, V.P.; Personal Wireless Communications, 2005. ICPWC 2005. 2005 IEEE International Conference on Jan. 23-25, pp. 420-423.*
A Method of Fraud & Intrusion Detection for E-payment Systems in Mobile e-Commerce, Venkataram, P.; Sathish Babu, B.; Naveen, M.K.; Samyama Gungal, G.H.; Performance, Computing, and Communications Conference, 2007. IPCCC 2007. IEEE Internationa Apr. 11-13, 2007 pp. 395-401.*
Automatic mobile payment on a non-connected vending machine, Azami, S.B.Z.; Tanabian, M.; Electrical and Computer Engineering, 2004. Canadian Conference on vol. 2, May 2-5, 2004 pp. 731-734 vol. 2.*

* cited by examiner

*Primary Examiner*—David Y Jung
(74) *Attorney, Agent, or Firm*—Merchant & Gould P.C.

(57) ABSTRACT

The invention provides a method and system (10) for enabling use of a communication network by a subscriber. The system includes a database (12) including data on a plurality of subscribers and identification means for remotely identifying subscriber. The systems further includes a verification means for verifying subscriber details with reference to the database and a stock of enabling codes (20) which, when fed into the network allow commutation via the network to a predetermined extent. In use, the subscriber is identified remotely, his details are verified and he is then provided with an enabling code permitting communications via the network.

23 Claims, 3 Drawing Sheets

COMMUNICATION SYSTEMS

Figure 1:
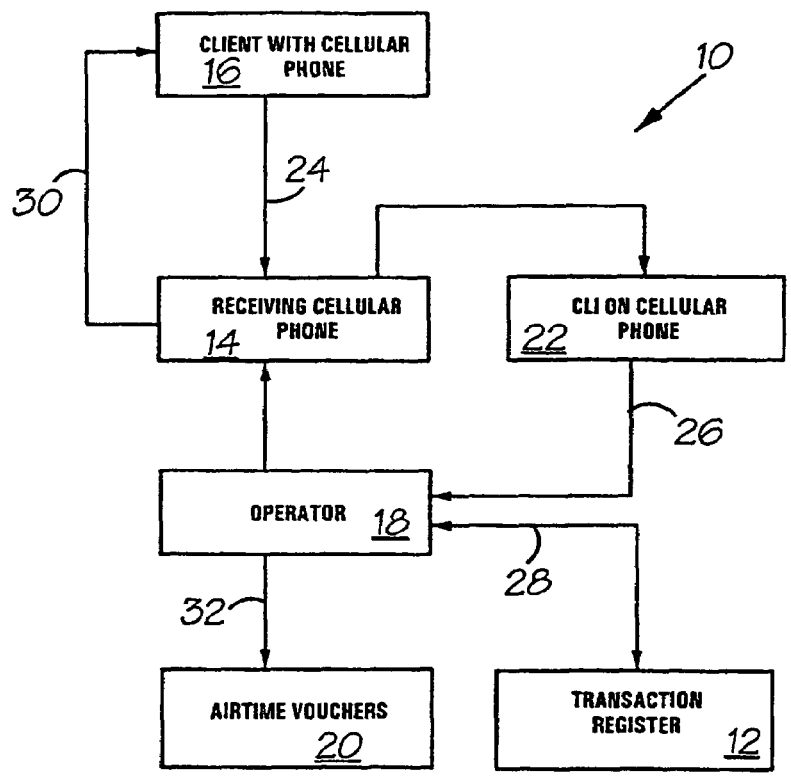

This application is a Continuation of application Ser. No. 10/297,070, filed Feb. 23, 2003, which is a National Stage application of PCT/IB01/00782, filed May 9, 2001, which applications are incorporated herein by reference.

THIS INVENTION relates to communication systems. In particular, it relates to a method of, and a system for, enabling use of a communication network by a subscriber. It also relates to a method of dispensing enabling codes to a cellular telephone user.

In South Africa there has been a proliferation in the use of cellular telephones or cellphones especially using the so-called "pay as you go" or prepaid system. In this system, a user or subscriber purchases airtime to a selected value from a cellular service provider in advance thereby allowing the subscriber to use a cellular telephone to communicate via the provider's cellular network to a predetermined extent. In order to initiate use of the network, the user or subscriber typically purchases a voucher of a particular value. The voucher provides an enabling or PIN code that is fed into the network via the cellphone thereby to enable use of the network for the selected value. Once the cumulative use of the network by the user reaches the value of the purchased airtime, and the voucher has been depleted, use of the network by the user is terminated and a further voucher must then be purchased. It is this application of the invention which must be predominantly, but not exclusively, borne in mind. It is however to be appreciated that the invention may be applied in any communication media, e.g. a conventional landline telephone or the like.

According to one aspect of the invention there is provided a method of enabling use of a communication network by a subscriber, the method including remotely identifying the subscriber;

verifying subscriber details with reference to subscriber details stored in a subscriber database; and selectively providing the subscriber with an enabling code which, when fed into the network, provides the subscriber with airtime credit which allows communication via the network to a predetermined extent.

The communication network is typically a cellular communication network and the subscriber purchases airtime to communicate via his or her cellular telephone on the network.

According to another aspect of the invention there is provided a method of dispensing an enabling or PIN code to a cellular telephone user which includes the steps of remotely identifying the user;

verifying user details with reference to user details stored in a user database; and selectively providing the user with an enabling or PIN code.

According to yet another aspect of the invention there is provided a system for enabling use of a communication network by a subscriber, the system including a database including data on a plurality of subscribers requiring use of the communication network;

identification means for remotely identifying the subscriber;

verification means for verifying subscriber details with reference to the database; and a stock of enabling codes from which an enabling code is selectively dispensed to the subscriber, the enabling code being operatively fed into the network to allow communication via the network to a predetermined extent.

Remotely identifying the subscriber or user may include receiving a telephone call from the subscriber or user on a receiving telephone.

The method may include identifying the subscriber or user by means of a caller line identification facility.

The method may include obtaining a password from the subscriber or user and verifying the password in the database.

In one embodiment of the invention, the verification means and identification means are in the form of a human operator located at a central dispensing location. The telephonic communication means used by the operator may be a cellphone thereby to identify the subscriber or user via its CLI (caller line identification) facility. In another embodiment of the invention, the system may include a conventional landline telephone with CLI means, e.g. a conventional CLI module, for identifying the subscriber or user calling the operator.

The method may include identifying the subscriber or user without answering the telephone call from the subscriber or user and calling the subscriber or user back to obtain the password. This arrangement minimises the cost to the subscriber or user when purchasing additional airtime.

The method may include logging subscriber or user calls in an administration system and then sequentially calling back the subscribers or users logged in the administration system.

Obtaining the password may include automatically answering the subscriber's or user's telephone call by means of an interactive telephone system which obtains the password from the subscriber or user.

The subscriber or user may provide his password via a keypad on the subscriber's telephone.

The method may include, prior to providing the subscriber or user with an enabling code, obtaining from the subscriber or user the monetary value of the airtime credit the subscriber or user wishes to purchase and checking to ensure that the subscriber or user has sufficient funds to purchase the airtime credit.

The method may include obtaining the enabling code from a supply of enabling codes.

Obtaining the enabling code may include selecting a voucher from a stock of vouchers on which the enabling codes are provided.

The method may include obtaining the enabling code from enabling code dispensing means which has a stock of enabling codes in electronic form.

Providing the subscriber or user with an enabling code may include sending the code to the subscriber or user by way of an SMS message.

The database may include financial data on each of the subscribers or users, the system being configured to update the data base to reflect each transaction with each subscriber or user.

The database typically includes data, e.g. financial data, on a substantial number of subscribers or users. For example, the database may include data on a remaining deposit which the subscriber or user has, whether or not credit may be granted to the subscriber or user, or the like. Accordingly, the system may include accounting software and, optionally, a transaction register for recording each transaction conducted with a particular subscriber or user.

The database may include a plurality of different codes or vouchers, each of which is associated with a different value of airtime. Accordingly, the subscriber or user may select an amount which he wishes to spend and a voucher or code corresponding therewith may be dispensed to the subscriber or user.

The system may include telephonic communication means for receiving a telephone call from a subscriber or user.

The identification means may include a caller line identification (CLI) facility.

The system may include an administration module for logging calls received from subscribers or users.

The telephonic communication means may include a receiving telephone, the system including an operator who obtains a password from the subscriber or user and uses the password to verify the subscriber's or user's details.

The system may include an interactive telephone system configured to obtain a password from a subscriber or user to verify the subscriber's or user's details, in particular without the intervention of an operator.

The system may include a computer with an administration system and a caller line identification module, a modem for receiving a telephone call from a subscriber or user who is identified by the caller line identification module, the modem being linked to the computer so that the subscriber's or user's identification details are fed to the computer for recordal on the database.

The stock of enabling or PIN codes may be in the form of paper vouchers. The paper vouchers may be as currently available in the market place.

However, in more sophisticated embodiments of the invention, the stock of enabling codes may be in electronic form, e.g. stored in a database. The stock of enabling codes may be obtained from a conventional OCS machine which purchases vouchers directly from a supplier, e.g. VODAC™.

In a yet more sophisticated embodiment of the invention, the method includes identifying the subscriber or user in an automatic fashion from the subscriber's telephone call and logging the call in an administration system. The operator may then sequentially attend to calls logged in the administration system thereby, for example, to minimize the airtime costs incurred by the subscriber or user in waiting to be attended to. Accordingly, the system may include an administration module for logging calls received from subscribers or users.

The system may include enabling code dispensing means which has a stock of enabling codes stored in electronic format.

The system may include an SMS messaging system whereby an enabling code can be forwarded to a subscriber or user in the form of an SMS.

The invention is now described, by way of example, with reference to the accompanying diagrammatic drawings.

In the drawings, FIGS. 1 to 6 show various embodiments of a system, in accordance with the invention, for enabling use of a cellular communication network by a subscriber.

Referring in particular to FIG. 1 of the drawings, reference numeral 10 generally indicates a system, in accordance with the invention, for enabling use of a communication network by a subscriber or user. The system 10 includes a database 12, an operator telephone, typically a cellphone 14, a subscriber cellphone 16, identification means in the form of a human operator 18, and a stock of enabling codes 20 from which an enabling code is selectively dispensed to the subscriber. Upon receipt of the enabling or PIN code, the subscriber enters the digits into the subscriber cellphone 16 thereby feeding the enabling or PIN code into the cellular network which, in turn, allows communication via the network to a predetermined value in a conventional manner.

The database 12 is in the form of a transaction register which includes data on a substantial number of subscribers who have subscribed to the system 10. Typically, subscribers pay an up-front deposit for the purchase of airtime on the cellular network and financial data is entered into the database 12 as well as the subscriber's cellular telephone number, a password, or the like. In use, when a client or subscriber who is registered or recorded in the database 12 requires cellular airtime, the client calls a central dispensing centre at which the operator cellphone 14, the operator 18, the stock of enabling codes in the form of airtime vouchers, and the database 12 are located. The operator 18 is equipped with the operator cellphone 14 which has a CLI (caller line identification) facility 22 for identifying the cellular telephone number of the subscriber cellphone 16.

When the subscriber calls the operator 18 as shown by line 24, the subscriber terminates the telephone call after about three rings in order to reduce the airtime costs incurred by the subscriber. The operator 18 then identifies the subscriber by means of the CLI facility 22 as shown by line 26, and retrieves subscriber details from the database 12 as shown by line 28. In particular, the operator 18 checks to see whether or not the cellular telephone number identified corresponds with a subscriber which is registered in the database 12 and, if so, whether or not the subscriber has sufficient funds remaining for the purchase of at least one further airtime voucher from the stock of enabling codes 20. It is however to be appreciated that the system 10 may in addition, or instead, be used to buy cellular airtime on credit.

If sufficient funds are available, the operator 18 then calls the subscriber as shown by line 30 and requests a password from the subscriber. If the password corresponds with the password stored in the database 12, the subscriber is then asked which particular airtime voucher from the stock of enabling codes 20 is required. Typically, the subscriber then informs the operator 18 of the monetary value which he or she intends to spend and, as shown by line 32, an appropriate voucher is then retrieved from the stock of enabling codes 20. The operator 18 then communicates the unique enabling code or PIN code corresponding with the voucher telephonically to the subscriber and enters the transaction details in the database 12. The particular subscriber's account in the database 12 is then debited with the appropriate amount. In a similar fashion to conventional airtime vouchers, the subscriber then feeds in the unique enabling or PIN code into the subscriber cellphone 16 which is then communicated to the cellular communication network thereby to enable use of the communication network to a predetermined value which is dependent on the particular voucher purchased by the subscriber.

Referring in particular to FIGS. 2 to 6 of the drawings, reference numerals 10.1 to 10.5 respectively generally indicate further embodiments of systems in accordance with the invention. These systems 10.1 to 10.5 resemble the system 10 and, accordingly, like reference numerals have been used to indicate the same or similar features unless otherwise indicated.

Figure 2:
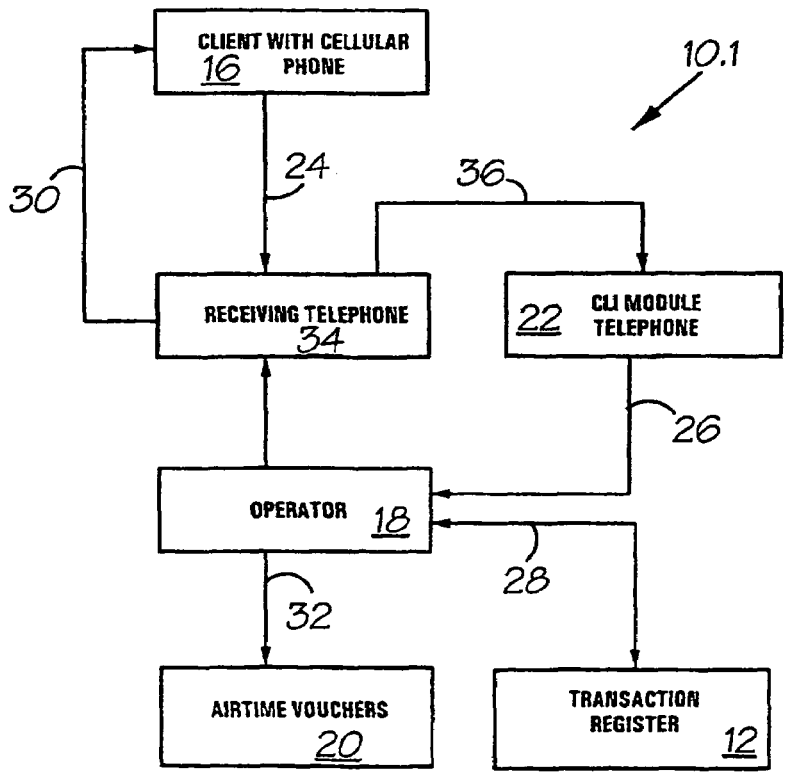

Referring in particular to FIG. 2 of the drawings, unlike the system 10, the system 10.1 includes a conventional landline telephone 34 which is connected via line 36 to a CLI facility 22 which, typically, is a conventional CLI module which may be purchased in the marketplace. In use, the subscriber thus calls the conventional landline telephone 34 by means of the subscriber cellphone 16 and the operator 18, by means of the CLI module 22, may thus identify the subscriber and process the request in a similar fashion to that described above.

Figure 3:
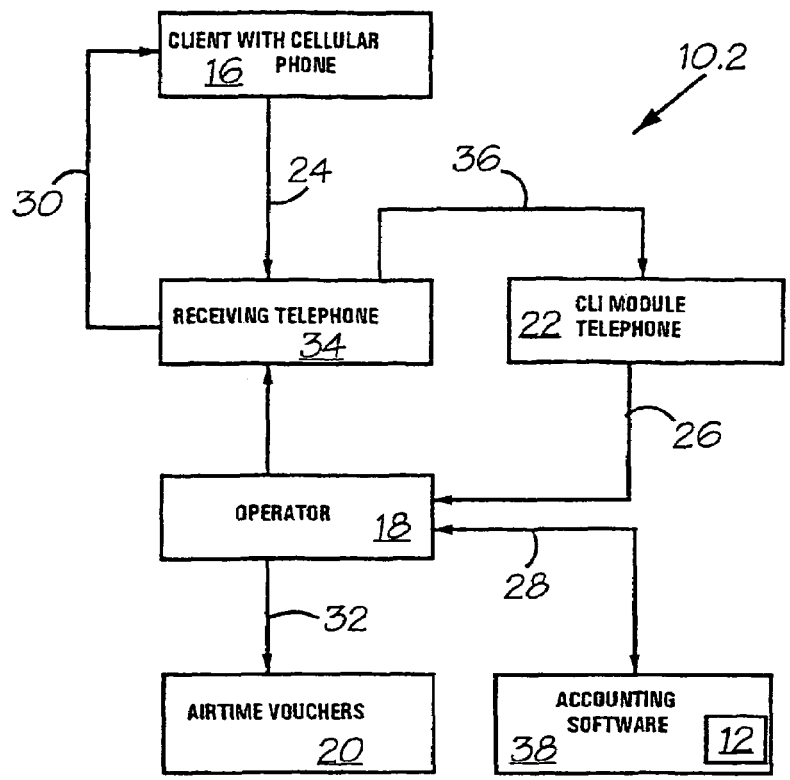

Referring in particular to FIG. 3 of the drawings, the system 10.2 substantially resembles the system 10.1 but differs in that a personal computer (PC) 38 with appropriate accounting software is provided in addition to the database 12. The system 10.2 operates in substantially similar fashion to the abovementioned systems 10, 10.1, however, the accounting software is typically in the form of a package such as Quickbook 6 from the Intuit Corporation. The operator 18 may thus enter subscriber or client details into the PC 38 which then, by means of its accounting software, processes the information, debits the client's account, manages the database, and the like.

Figure 4:
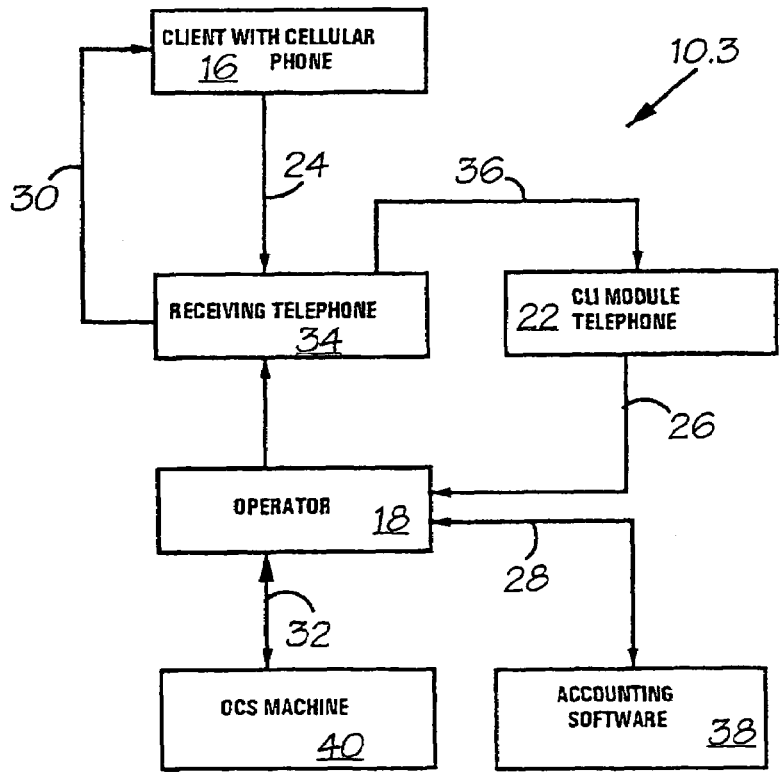

Referring in particular to FIG. 4 of the drawings, the system 10.3 substantially resembles the system 10.2, however, the stock of enabling codes 20 is not in the form of paper vouchers. In particular, the system 10.3 includes a conventional OCS machine 40 which has a stock of enabling codes or PIN codes in an electronic form. For example, the OCS machine may be a conventional OCS machine as supplied by VODAC™ in South Africa. The OCS machine 40 may thus download a stock of enabling or PIN codes from the supplier which are then selectively dispensed to subscribers to the system 10.3. For example, the operator 18 may, upon request from a subscriber, activate the OCS machine 40 and purchase a voucher in electronic form for the value requested by the client or subscriber. Typically, the OCS machine 40 then, in a conventional fashion, prints a slip which includes the unique enabling code or PIN code. In a similar fashion to that described above, the enabling code or PIN code is then communicated by the operator 18 to the subscriber thereby to enable the subscriber, upon entering the code into the cellular phone 16, to use the network to the value associated with the particular enabling or PIN code.

Figure 5:
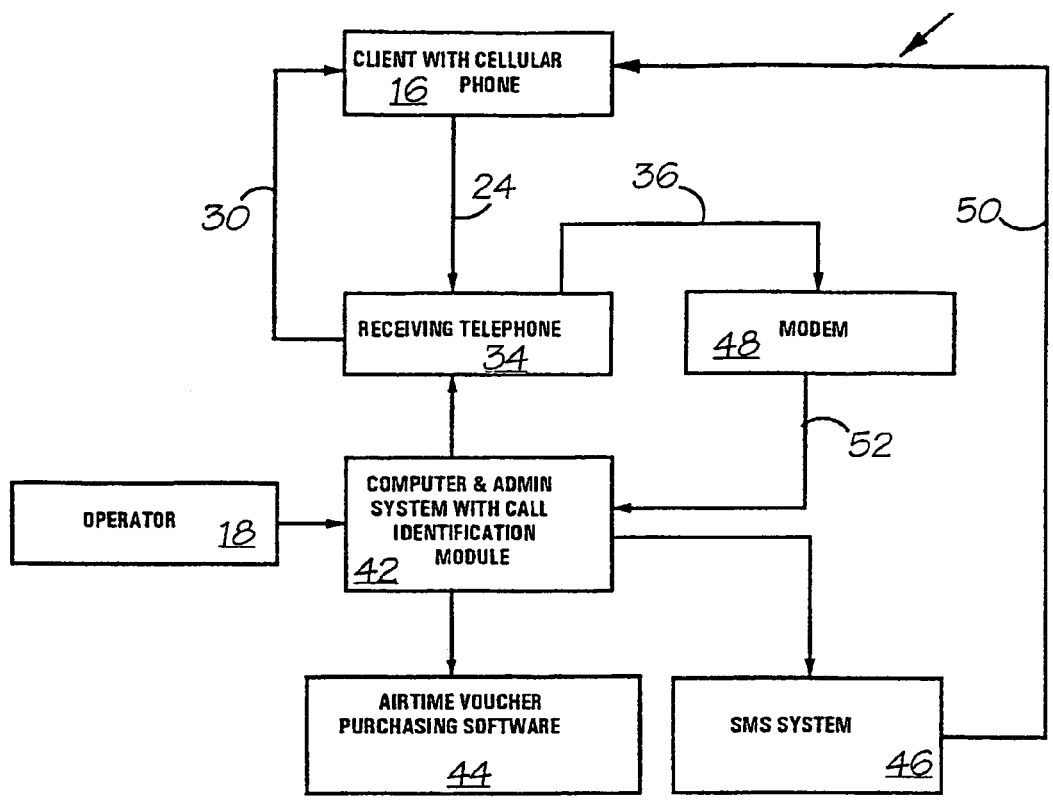
Figure 6:
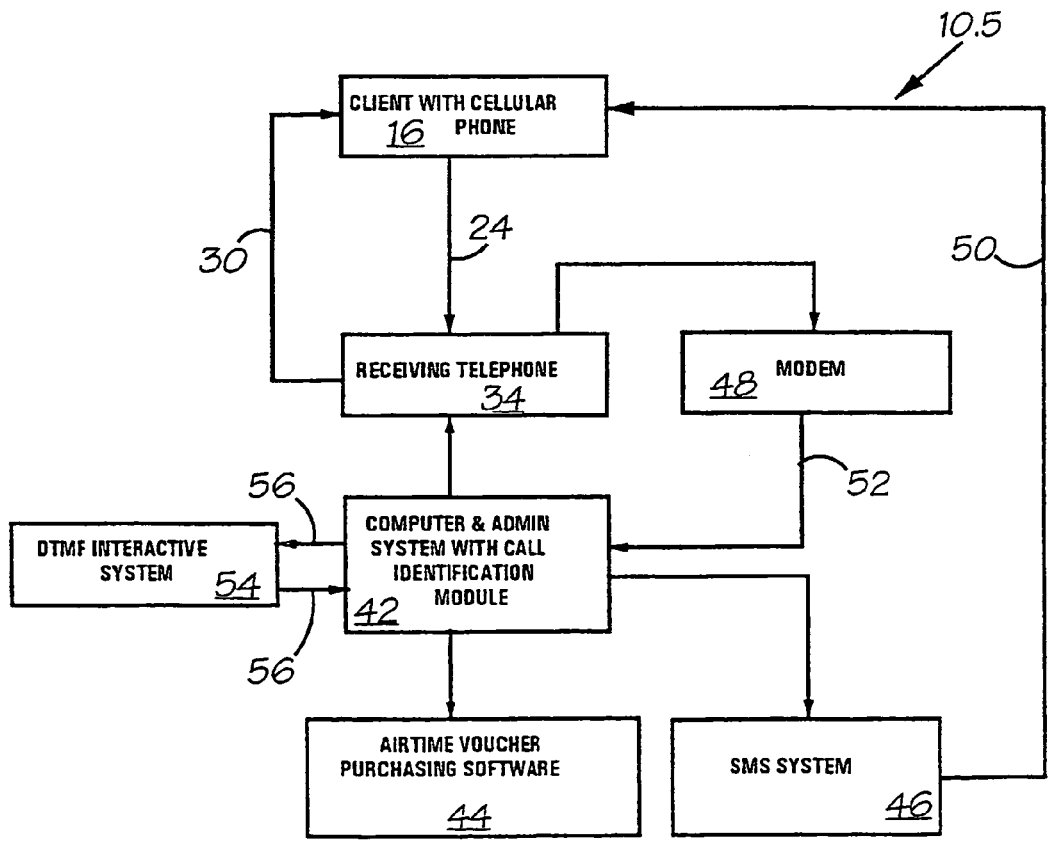

More sophisticated embodiments of the invention are shown in FIGS. 5 and 6 of the drawings. Referring in particular to FIG. 5 of the drawings, the system 10.4 is more automated than the systems 10, 10.1, 10.2, and 10.3. The system 10.4 includes a personal computer (PC) 42 with an administration system and a CLI module. Typically, the administration system includes software such as that developed by CS Webworx for Prepaid Online. Further, the system 10.4 includes airtime purchasing software 44, an SMS messaging system 46, and a modem 48. The airtime purchasing software 44 allows bulk downloading of enabling codes or vouchers from a service provider, e.g. bulk downloading at about 200 vouchers per request. The SMS messaging system 46 typically generates an e-mail message which can be transmitted via the Internet to the subscriber cellphone 16 as shown by line 50. The administration software loaded on the PC 42 is typically similar to that provided by PEC Systems GB.

As with the systems described above, in the system 10.4 the subscriber or client makes a telephone call with his or her subscriber cellphone 16 to a central dispensing location at which the landline telephone 34 and associated equipment of the system 10.4 is located. The modem 48 receives the telephone call and the CLI module identifies the telephone number of the caller. Identification details are then fed into the PC 42 via line 52 and the PEC Systems software then records the data in its internal database. As in the cases mentioned above, the subscriber terminates the call after about three rings which is sufficient to identify the subscriber. The administration software then displays the number, and numbers of all the other subscribers which have called in and been logged into the system 10.4 sequentially. The operator 18 then via the modem 48 calls the subscriber and requests the subscriber to furnish a password. The password is then entered into the PC 42 and verified in its database. The administration software on the PC 42 then retrieves, inter alia, financial details such as the amount which the subscriber has available in the system 10.4. The administration software then only activates vouchers or enabling codes for which the subscriber has sufficient credit to purchase. The operator 18 then requests the client to indicate which particular voucher or enabling code is required and the subscriber's choice is then entered into the administration software via a keyboard of the PC 42. The administration software then retrieves the airtime voucher or enabling code selected by means of the airtime purchasing software 44. The airtime purchasing software 44 ensures that a minimum stock of enabling codes is always present in the system 10.4.

Once the particular enabling code or PIN code has been obtained by means of the airtime purchasing software 44, an SMS message including the code is generated by means of the SMS messaging system 46 and communicated to the subscriber as shown by line 50. The SMS messaging system 46 delivers a text message which is displayed in a conventional fashion on the subscriber cellphone 16. The administration software then logs the transaction and performs the necessary accounting functions.

Referring in particular to FIG. 6 of the drawings, the system 10.5 substantially resembles the system 10.4. However, unlike the system 10.4 which requires intervention by means of the operator 18, the system 10.5 includes a DTMF interactive system 54, typically a PEC DTMF system. The DTMF interactive system 54 automatically answers the call from the subscriber cellphone 16 and obtains the appropriate record from the administration system stored in the PC 42 as shown by lines 56.

The DTMF interactive system 54 includes voice synthesis technology so that the subscriber may be welcomed and the subscriber is then informed that he has reached the system 10.5. The subscriber is then identified by the DTMF interactive system 54 as shown by lines 56. Thereafter, the DTMF system 54 requests the subscriber or client to furnish a password, typically entered via a keypad of the subscriber's cellphone 16, and the password is then verified for authenticity. If the password is incorrect, the DTMF system 54 informs the subscriber that the password entered was incorrect and the telephone call is then terminated.

However, if the password is correct, the DTMF interactive system 54, in a pre-recorded fashion, requests the client to identify which particular voucher with its unique enabling code is required. For example, the DTMF system 54 may communicate the following message to the client: "To purchase R55 of airtime press 1, to purchase R110 of airtime press 2, to purchase R275 of airtime press 3" and so on. The subscriber then activates the appropriate key on the subscriber cellphone 16 and the DTMF interactive system 54 thereby identifies which particular voucher the subscriber requires. In certain embodiments, the DTMF system 54 may request the client to confirm the particular selection, for example, by pressing the # key. Once the client has identified which particular voucher, and thus which associated enabling code is required, the DTMF system 54 terminates the call.

Thereafter, the administration software in the PC 42 obtains the first available airtime PIN number or enabling code via the airtime voucher purchasing software 44 and, in a similar fashion as described above, an SMS message is generated by the SMS system 46. The SMS message may then, for example, be communicated via the Internet to a provider who then communicates the SMS message via a cellular telephone network to the subscriber. Finally, details of the transaction are recorded in the database and the subscriber's or client's account is debited accordingly.

The Inventor believes that the invention, as illustrated, provides an enhanced method of, and system 10, 10.1 to 10.5, for enabling use of a communication network by a subscriber. The method enables dispensing of enabling codes or vouchers to a cellular telephone user remotely without the need for the subscriber physically to obtain a voucher from a service provider.

The invention claimed is:

1. A method of enabling use of a communication network by a subscriber, the method including
   receiving a telephone call from the telephone of the subscriber on a receiving telephone;
   remotely identifying the subscriber;
   verifying subscriber details with reference to subscriber details stored in an electronic subscriber database; and
   selectively providing the subscriber with a value carrying enabling code which the subscriber can feed into the communication network to provide the subscriber with airtime credit which allows communication via the communication network to a predetermined extent corresponding to the value of the enabling code.

2. A method as claimed in claim 1, which includes identifying the subscriber by means of a caller line identification facility.

3. A method as claimed in claim 1, which includes obtaining a password from the subscriber and verifying the password in the subscriber database.

4. A method as claimed in claim 3, which includes identifying the subscriber without answering the telephone call from the subscriber and calling the subscriber back to obtain the password.

5. A method as claimed in claim 4, which includes logging subscribing calls in an administration system and then sequentially calling back the subscribers logged in the administration system.

6. A method as claimed in claim 5, in which the subscriber provides his password via a keypad on the subscriber's telephone.

7. A method as claimed in claim 3, in which obtaining the password includes automatically answering the subscriber's telephone call by means of an interactive telephone system which obtains the password from the subscriber.

8. A method as claimed in claim 1, which includes, prior to providing the subscriber with an enabling code, obtaining from the subscriber the monetary value of the airtime credit the subscriber wishes to purchase and checking to ensure that the subscriber has sufficient funds available to purchase the airtime credit.

9. A method as claimed in claim 8, which includes obtaining enabling code carrying the desired monetary value from a supply of enabling codes.

10. A method as claimed in claim 1, in which, providing the subscriber with an enabling code, includes sending the code to the subscriber by way of an SMS message.

11. A method of dispensing a value carrying enabling or PIN code to a cellular telephone user which includes the steps of
   receiving a telephone call from a cellular telephone of the user on a receiving telephone;
   remotely identifying the user;
   verifying user details with reference to user details stored in an electronic user database; and
   selectively providing the user with a value carrying enabling or PIN code which the user can feed via the cellular telephone of the user into a network of a cellular telephone service provider thereby permitting use of the network by the cellular telephone to a value corresponding to the value carried by the enabling or PIN code.

12. A method as claimed in claim 11, in which providing the user with an enabling code includes sending the code to the user by way of an SMS message.

13. A method as claimed in claim 11, which includes identifying the user by means of a caller line identification facility.

14. A method as claimed in claim 11, which includes obtaining a password from the user and verifying the password in the user database.

15. A method as claimed in claim 11, which includes, prior to providing the user with an enabling code, obtaining from the user the monetary value of the airtime credit the user wishes to purchase and checking to ensure that the user has sufficient funds available to purchase airtime credit.

16. A system for enabling use of a communication network by a subscriber, the system including
   telephonic communication means for receiving a telephone call from a telephone of the subscriber;
   an electronic database including data on a plurality of subscribers requiring use of the communication network;
   identification means for remotely identifying the subscriber;
   verification means for verifying subscriber details with reference to the database; and
   a stock of value carrying enabling codes from which an enabling code is selectively dispensed to the subscriber, which enabling code can be operatively fed by the subscriber into the communication network to allow communication via the network to a value corresponding to the value of the enabling code.

17. A system as claimed in claim 15, in which the database includes financial data on each of the subscribers, the system being configured to update the data base to reflect each transaction with each subscriber.

18. A system as claimed in claim 16, in which the identification means includes a caller line identification facility.

19. A system as claimed in claim 16, which includes an administration module for logging calls received from subscribers.

20. A system as claimed in claim 16, in which the telephonic communication means includes a receiving telephone, the system including an operator who obtains a password from the subscriber and uses the password to verify the subscriber's details.

21. A system as claimed in claim 20, which includes a computer with an administration system and a caller line identification module, a modem for receiving a telephone call from a subscriber who is identified by the caller line identification module, the modem being linked to the computer so that the subscriber's identification details are fed to the computer for recordal on the database.

22. A system as claimed in claim 16 which includes an interactive telephone system configured to obtain a password from a subscriber to verify the subscriber's details.

23. A system as claimed in claim 16, which includes an SMS messaging system whereby an enabling code of the desired value can be forwarded to a subscriber in the form of an SMS.

* * * * *